J. A. GIBSON.
SOIL TILLER.
APPLICATION FILED JULY 17, 1918.
1,333,911.
Patented Mar. 16, 1920.
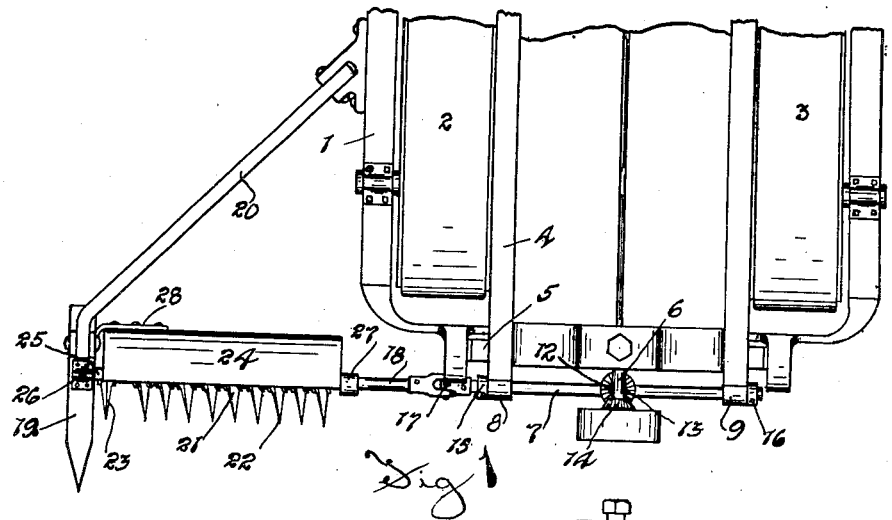
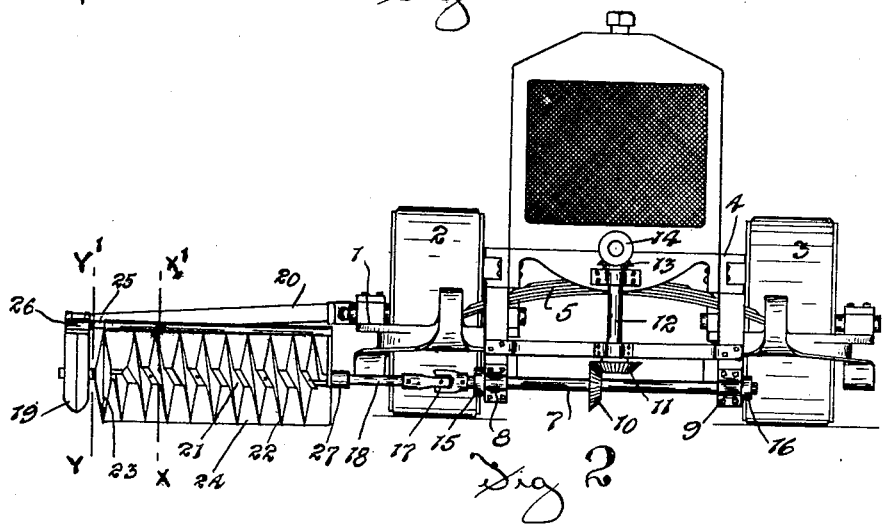
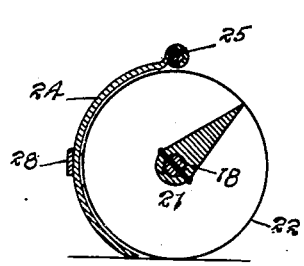
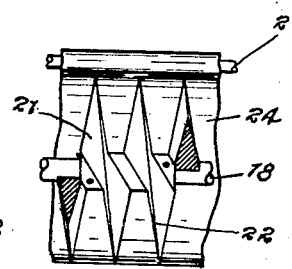
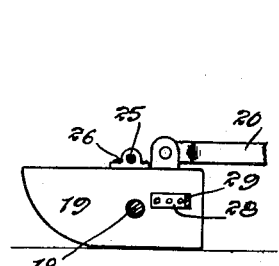
INVENTOR
J. A. Gibson
BY
ATTYS

UNITED STATES PATENT OFFICE.

JOHN A. GIBSON, OF EDMONTON, ALBERTA, CANADA.

SOIL-TILLER.

1,333,911.  Specification of Letters Patent.  Patented Mar. 16, 1920.

Application filed July 17, 1918. Serial No. 245,393.

*To all whom it may concern:*

Be it known that I, JOHN A. GIBSON, of the city of Edmonton, in the Province of Alberta, Canada, have invented certain new and useful Improvements in Soil-Tillers, of which the following is the specification.

The invention relates to improvements in soil tillers and the principal object of the invention is to provide a device attachable to a power machine such as a tractor which can be forced along the ground and will cut the ground to a predetermined depth and deliver the cut ground to the side and in a location in advance of the tractor wheels so that in the advancement of the tractor the delivered ground will be packed immediately after it has been passed to the side.

A further object of the invention is to construct a soil tiller which will, by a rotary worm action, cut the soil and deliver it to the side and which can be speeded so that the soil delivered can be spread at the delivery end.

A further object is to provide by virtue of the above arrangement a device which will effectively cut and destroy weeds, the weeds being cut well below the ground line and effectively turned over and covered at the side.

A further object is to provide a machine which will serve the function of several machines, that is to say, a machine which, when working, will plow the ground, cultivate it and pack the ground in one operation.

With the above principal objects in view and other minor objects which will appear as the description proceeds, the invention consists essentially in the arrangement and construction of parts hereinafter more particularly described and later pointed out in the appended claims, reference being had to the accompanying drawing in which:—

Figure 1 represents a plan view of the front end of a tractor with my invention attached thereto.

Fig. 2 represents a front end view of the parts as they appear in Fig. 1.

Fig. 3 represents an enlarged detailed vertical sectional view through the cutter, the section being taken in the plane denoted by the line X—X' Fig. 2.

Fig. 4 represents an enlarged detailed fragmentary front view of a portion of the cutter and hood.

Fig. 5 represents an enlarged detailed vertical sectional view through the outer end of the tiller, the section being taken in the plane denoted by the line Y—Y' Fig. 2 and looking to the left.

In the drawing like characters of reference indicate corresponding parts in the several figures.

In utilizing my invention it is desirable to connect and operate it from a tractor and preferably from a tractor of the type known as the caterpillar tractor. Such a machine is shown in the drawing and presents a main frame 1 and two endless driven tracks 2 and 3 carried by the usual driven track wheels (not shown) mounted in the frame.

Further the tractor presents what might be termed an engine frame 4 suitably suspended by springs 5 from the tractor frame. 6 represents the engine shaft of the tractor.

I have not considered it necessary to give a more detailed description of this tractor as the construction of them is well known and they are a commercial commodity existing under a variety of names.

The parts described are simply referred to so that the connection of my soil tiller can be clearly understood.

At the front of the tractor I mount a driving shaft 7 which is carried by suitable bearings 8 and 9 suspended from the engine frame. This shaft is driven by bevel pinions 10 and 11 from a counter shaft 12 which is connected through suitably disposed bevel pinions 13 and 14 with the engine shaft. The details of this particular driving arrangement are of no consequence as any suitable drive could be employed to effect the driving of the shaft 7 from the engine of the tractor. The shaft 7 is fitted with end collars 15 and 16 which prevent end play and it is connected through a universal joint indicated at 17 with an outstanding shaft 18, the outer end of which is rotatably mounted in a shoe 19 riding on the ground. The shoe is braced, that is to say, is held ahead by means of a brace bar 20 which is pivotally secured both to the shoe and to the main frame 1 of the tractor. On the shaft 18 I mount and secure a cutter 21 in the nature of a worm presenting a spiral cutting edge 22, the external diameter and pitch of the worm being of a predetermined measurement consistent with the work for which the machine is constructed.

At the outer end of the worm I locate a cutting disk 23 which serves as a liner for the tiller. The worm is arranged so that when the shaft 18 is turned in a right hand direction it will deliver material toward the tractor and in this connection I wish it to be particularly noticed that what might be termed the delivery end of the cutter is located in advance of the adjacent track 2 of the traction machine so that the material delivered by the worm will be thrown in front of the track. The rear side of the worm is inclosed within a fixed hood 24 which is swung from a carrying rod 25 located above the worm and having the outer end mounted at 26 on the shoe and the inner end carried from a sleeve 27 rotatably mounted on the shaft 18. The hood is positively prevented from rotating in any suitable manner such as by a bracket 28 secured to the rear side thereof and connected permanently as indicated at 29 (see Fig. 5) to the shoe.

The lower edge of the hood follows directly behind the worm as best shown in Fig. 3 of the drawing and from this arrangement it will be seen that the hood incloses what might be called the rear half of the worm and leaves the front half of the worm open for cutting purposes.

While I have not shown any means for adjusting the tiller in respect to the ground, that is, so that it can cut shallow or deep, I wish it to be distinctly understood that an adjustment could be readily provided as is common in a great many of the existing types of agricultural implements.

With this appliance in use it will be observed that the tractor, instead of operating on the unplowed or uncultivated land actually operates on the cultivated land. That is to say, the tractor works on the land previously cultivated by the tiller.

Further it will be understood that owing to the construction of the worm there will be what might be termed a flat bottomed furrow more or less of the length of the worm left after the worm has cut the ground. The track of the tractor next the tiller operates in this furrow.

Considering now the machine in action and that the track 2 is working in a previously cut furrow; as the tractor advances the cutting edges of the worm cuts the soil and the cut soil is delivered to the side by the worm and into a position directly in front of the track 2. By properly speeding the rotation of the worm this cut soil can be delivered so that it is spread over the previously cut furrow in which the track 2 is operating and so that it is easily packed by the oncoming track 2. By properly gaging the depth of the cut of the worm I can effectively cut all weeds and similar undesirable growth and the weeds will be effectively turned over and discharged at the end of the tiller and packed underneath the discharged soil by the oncoming track of the tractor.

In this way it will be seen that in the one operation I not only cut the soil and cultivate it but that immediately after cultivating I pack it, which operation is usually done by several machines.

While I have shown only one worm, I wish to state that several may be employed provided a special hitch were utilized for connection to the tractor.

What I claim as my invention is:—

1. The combination with a tractor, of a rotary soil tiller connected to the tractor frame and extending outwardly from the side thereof and driven by the tractor and constructed to cut the soil and deliver it in advance of the adjacent tractor wheel.

2. The combination with a tractor presenting driven tracks, of a rotary tiller connected to the tractor frame and extending outwardly therefrom and driven by the tractor and designed to cut the soil and deliver it in a location in advance of the adjacent track.

3. The combination with a frame, of a driving shaft carried by the frame, a driven shaft connected to the driving shaft and extending to the side of the frame, a shoe carrying the outer end of the driven shaft, a brace bar extending between the shoe and the frame, a worm mounted on the driven shaft and presenting a spiraling cutting edge and designed to deliver inwardly toward the frame, a hood inclosing the rear side of the worm and a liner wheel mounted on the driven shaft adjacent the shoe.

Signed at Winnipeg, this 25th day of June, 1918.

JOHN A. GIBSON.

In the presence of—
G. S. ROXBURGH,
K. B. WAKEFIELD.